May 26, 1970  C. H. ZWEIFEL ET AL  3,514,146
EXTENSIBLE LIFTING SPREADER
Filed Feb. 26, 1968  2 Sheets-Sheet 2
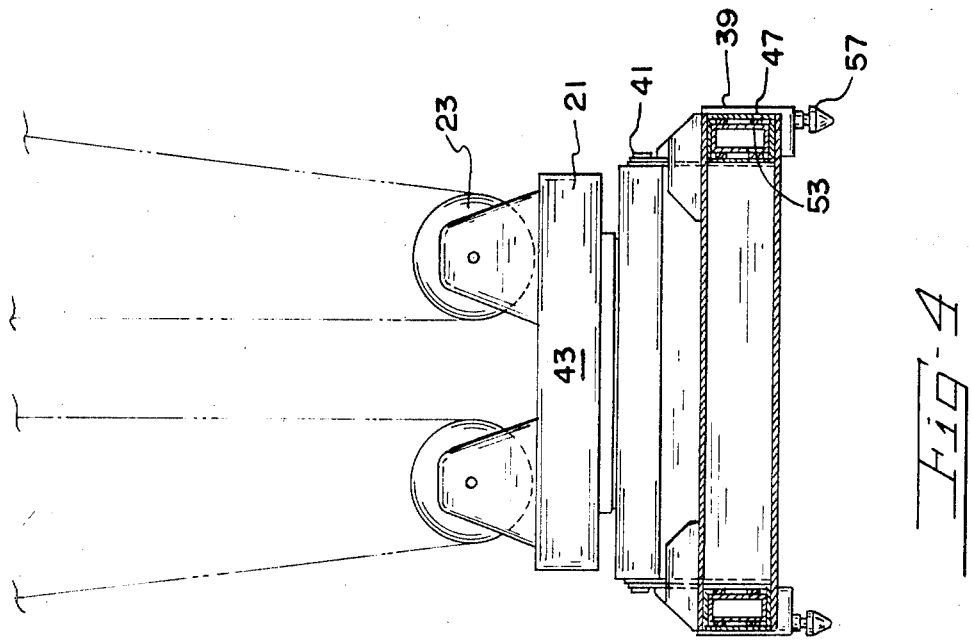
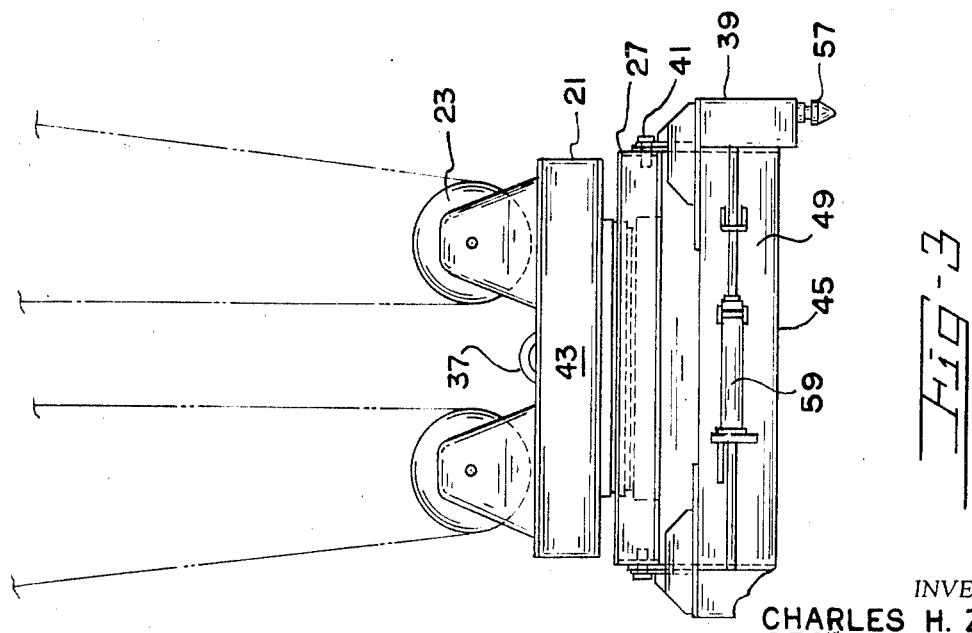
INVENTORS
CHARLES H. ZWEIFEL
GEORGE W. COOPER
BY
Charles O. Bruce
ATTORNEY

United States Patent Office 3,514,146
Patented May 26, 1970

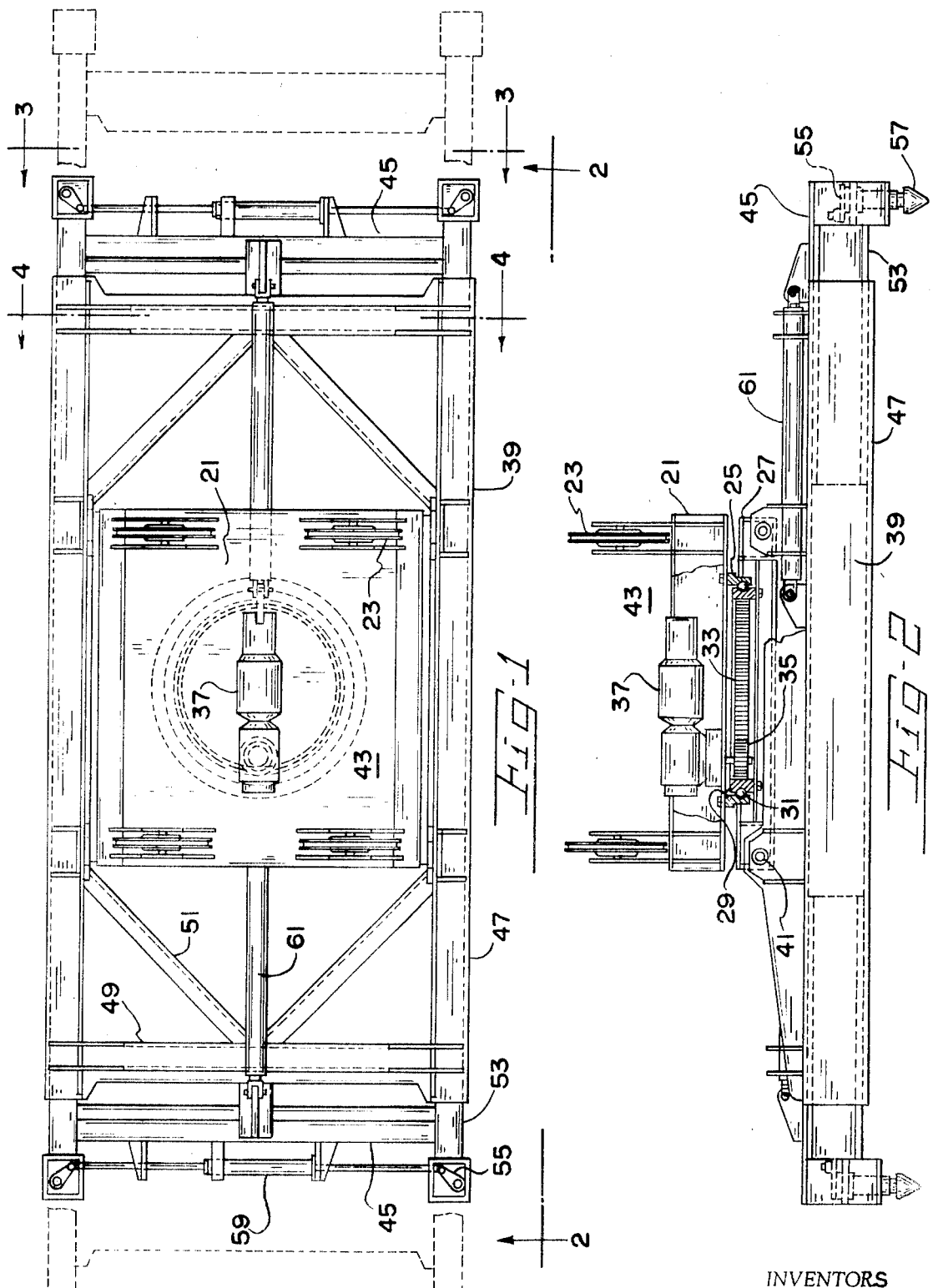

3,514,146
EXTENSIBLE LIFTING SPREADER
Charles H. Zweifel, Oakland, and George W. Cooper, San Leandro, Calif., assignors, by mesne assignments, to Fruehauf Corporation, Detroit, Mich., a corporation of Michigan
Continuation-in-part of application Ser. No. 643,993, June 6, 1967. This application Feb. 26, 1968, Ser. No. 708,250
Int. Cl. B66c 1/00
U.S. Cl. 294—67    4 Claims

ABSTRACT OF THE DISCLOSURE

A lifting spreader having a central portion and two end portions which can be reciprocated with respect to the center portion by means of hydraulic cylinders whereby the length of the spreader is adjustable.

CROSS REFERENCES TO RELATED APPLICATIONS

The present application is a continuation-in-part of presently pending U.S. patent application Ser. No. 643,993 for Rotatable and Convertible Lifting Spreader by Charles H. Zweifel and George W. Cooper filed June 6, 1967, now Pat. No. 3,436,113 issued Apr. 1, 1969.

BACKGROUND OF THE INVENTION

Field of the invention

The present invention relates to lifting spreaders and more particularly to a lifting spreader which is extensible to handle different lengths of cargo containers. It further relates to lifting spreaders which are both rotatable and extensible.

The new and efficient method of handling cargo by the transportation industry includes the use of standard size cargo containers which may be loaded onto truck trailers, or railroad cars, or into shipboard storage cells. The size and weight of the containers have caused the development of a new and different complement of cargo handling equipment.

Certain standards have been developed for the size, configuration, and strength of cargo containers by the American Standards Association and the International Standards Organization. These provide for containers in lengths of twenty, twenty-four, thirty, thirty-five, and forty feet, and end cross sections eight feet square. Thus, it is necessary to provide lifting spreaders which can accommodate the different standard lengths of cargo containers.

In addition to standardization of sizes, there has been standardization of means utilized to pick up the cargo containers. The most common utilizes twist locks which are disposed at the corners of the lifting spreader and engage twist lock receptacles positioned in the corners of the upper surface of the cargo containers. Other means include bottom lift grapples which depend from the edges of the lifting spreader and hook under the lower edges of the container in order to lift it. Still another means utilizes hooks at the corners of the lifting spreader which engage female receptacles on the container.

A further problem in handling cargo containers is that the spreader must be accurately aligned with the container in order to effect engagement therewith. This often requires the lifting spreader to be rotated in a horizontal plane to achieve alignment. Likewise, it is often necessary to again rotate the spreader to align the suspended load with the position in which it is to be deposited, such as on a truck trailer or within the guides of a shipboard storage cell.

Description of the prior art

There have been many lifting spreader assemblies devised for handling cargo containers, some designed with a capability for handling different size and different type cargo containers and others designed with a capability for versatile manipulation and handling of the container.

The difficult problem is in designing a lifting spreader capable of versatile handling of different length cargo containers. One such spreader utilizes an upper platform portion which is semi-permanently suspended from the reeving of a crane and a lower frame portion pin connected to the upper platform. The lower frame carries the cargo container engagement means for picking up the cargo container and is made in different lengths whereby different length cargo containers may be handled by switching lower frames. Another spreader includes a beam or frame having grapple hooks, or other container engagement means, mounted on trolleys which can be moved along the beam. The variable positioning of the trolleys permits the beam to handle different lengths of cargo containers.

Time is money in the transportation industry. Where cargo handling in the loading and unloading of transporter vehicles can be made more efficient, the vehicles can be kept moving more of the time where they earn money rather than standing still where they cost money in overhead expense. For this reason there is an urgent and continuous demand upon the manufacturers of cargo handling equipment to increase the efficiency of their machinery.

To handle cargo containers of different sizes, it has usually been necessary to change cargo lifting spreaders in order to accommodate the different length containers. This has been facilitated by the use of pin connections whereby spreaders can be quickly changed. While this arrangement is the most efficient yet employed, it still causes work stoppage when it is necessary to effect the change.

SUMMARY OF THE INVENTION

When handling cargo containers of nearly the same size, it is desirable to have a lifting spreader which is adaptable to more than one different length container without the necessity of changing spreaders. The present invention provides a lifting spreader which is extensible and retractable in a horizontal direction to permit the spreader to handle different length cargo containers and effects increased efficiency in cargo handling. It includes a center section and two end portions, both of said end portions are reciprocal with respect to the center portions whereby the length of the spreader is adjustable. The end portions are reciprocated by means of hydraulic cylinders whereby a rapid rate of change of length is achieved.

OBJECTS OF THE INVENTION

It is therefore an important object of the present invention to provide a lifting spreader which is extensible and retractable in length.

It is another object of the present invention to provide a lifting spreader which can be quickly adjusted to different lengths for handling different size cargo containers without work stoppage.

It is a further object of the present invention to provide a lifting spreader which can hnadle different length cargo containers without re-reeving of the crane suspension system and without changing portions of the lifting machinery.

It is still another object of the present invention to provide a lifting spreader which can be adapted to present-

DESCRIPTION OF THE DRAWINGS

FIG. 1 is a plan view of a lifting spreader of the present inveniton;

FIG. 2 is a side elevation of the lifting spreader of the present invention partially broken away at one end;

FIG. 3 is an end elevation of the lifting spreader of the present invention; and FIG. 4 is an end elevation of the present invention in cross section taken along lines 4—4 of FIG. 1.

DESCRIPITION OF THE PREFERRED EMBODIMENT

The environment of the present invention is shown in the drawings of the previously referred to patent application Ser. No. 643,993. FIG. 1 thereof shows a dockside crane 11 lifting a cargo container 13 by means of the lifting spreader 15 which is suspended from the crane gantry by wire rope reeving 17.

FIGS. 1 to 4 of the present application show the details of construction of the present invention along with the details of the invention of the previously referred to patent application. Thereshown is a generally rectangular upper platform assembly 21 having wire rope sheaves 23 disposed proximate the corners thereof.

A first bearing race 25 is secured at the bottom of the upper platform assembly and is of a relatively large diameter which approaches the width of the lifting spreader when it is arranged for lowering into a cargo storage cell, but it is necessarily less than that width since the spreader must be lowerable into the cells which have tight clearances.

The generally rectangular lower rotatable frame 27 is disposed immediately below and closely adjacent the upper platform assembly. A second bearing race 29 is secured to the lower frame and is supported from the first bearing race by means of anti-friction bearings 31 which are disposed between the races. The centerline of the track or path of the anti-friction bearings, disposed between the races, has a diameter equal to or greater than one third the maximum width of the lifting spreader when arranged for lowering into a cargo storage cell. The second bearing race also forms a ring gear 33 internally thereof which meshes with the pinion gear 35 of the slewing drive 37 secured to the platform. The details of the construction and description thereof are fully set forth in the previously referenced patent application of the inventors.

In the presently described embodiment, the lifting spreader assembly, or the lifting beam 39, is pin connected to the lower rotatable frame proximate the corners thereof by means of the removable pins 41 which are inserted through the pin connections on the lifting beam and on the rotatable lower frame.

The lifting beam 39 comprises a center section 43 and two end portions 45 which are reciprocal with respect to the center section whereby the length of said spreader is adjustable. The center section includes a pair of beam members 47 secured to, or forming, the lateral edges thereof and which are interlocked by cross beams 49 and support beams 51. The beam members of the preferred embodiment have a box section, but they could be tubular or of an interlocking design which would engage the end portions of the spreader in captured sliding relation.

The end portions 45 are generally U shaped, and the legs 53 thereof, which engage the lateral beam members 47 of the center section, have a box section portion which meshes in female sliding relation within the box section of the lateral beam members.

The twist locks 55 of the present invention include studs 57 which project downward from the corners of the U shaped end portions of the spreader. The twist lock studs are operated by means of hydraulic cylinders 59 which rotate the studs to engage with receptacles on the container. Lifting grapples or wire rope slings can be utilized with the described embodiment for picking up loads of pipe or other elongated material. Other container engagement means can also be mounted on the end portions.

Means are provided for reciprocating the end portions of the spreader assembly with respect to the center section. In the preferred embodiment, this means comprises hydraulic cylinders 61 at each end of the spreader. One end of each cylinder is secured to the center section of the spreader and one end of each is secured to one of the U shaped end portions. Other means, such as electric motors, can also be used to reciprocate the end portions.

In the preferred embodiment, each cylinder has an extension capability of at least 5 feet. This permits one extensible spreader to handle 20, 24 and 30 foot containers and a second spreader to handle 30, 35, and 40 foot containers. An intermediate size could be made to handle 24, 30, and 35 foot cotnainers. By making the legs 53 of the two end portions intermesh with each other inside the lateral beam members, and by using longer hydraulic cylinders, it is possible to have the spreader extend over the whole range of sizes from 20 to 40 feet.

When the present invention is utilized with the rotatable lifting spreader of the referenced application, a very versatile and efficient lifting spreader is provided for cargo container handling. As a primary advantage, the present invention can be utilized for different length cargo containers without having to change the lifting beam suspended from the reeving. This increases the speed with which cargo containers may be handled and greatly reduces the time transporter vehicles are kept idle at transfer points.

It will be apparent from the foregoing description of the invention in its preferred form that it will fulfill all the objects attributable thereto. While it has been illustrated and described in considerable detail, the invention is not to be limited to such details as have been set forth except as may be necessitated by the appended claims.

We claim:

1. An extensible lifting spreader for handling cargo containers comprising
   a center portion having a pair of parallel box section hollow beam members secured to the lateral edges thereof,
   a pair of generally U shaped end portions, the legs of said end portions being slidably disposed within said beam members,
   means for reciprocating said U shaped end portions with respect to said center section, and
   means for engaging cargo containers disposed at the corner of the U shaped end portions at the junctions of the legs with the end beams.

2. The extensible lifting spreader of claim 1 wherein the means for engaging cargo containers comprises twist locks having means mounted on the U shaped end portions for operating the twist locks, said operating means being remotely and selectively controllable to permit at will engagement and disengagement of cargo containers by the operator.

3. The extensible lifting spreader of claim 1 wherein the means for reciprocating the U shaped end portions includes
   at least one hydraulic cylinder at each end of said spreader, each of said cylinders having one end thereof secured to said center portion and the other end secured to the connecting or end beam of said U shaped end portions, and
   means for operating said cylinders remotely and selectively to permit selection of variable lengths of lifting spreaders from the operator's control position.

4. An extensible lifting spreader for handling cargo containers comprising
- a center portion having a pair of parallel box section hollow beam members secured to the lateral edges thereof,
- a pair of generally U shaped end portions, the legs of said end portions having a box section and being slidably disposed within said beam members,
- a pair of remotely controllable aligned hydraulic cylinders for reciprocating said U shaped end portions with respect to said center section, each of said cylinders having one end thereof secured to said center portion on the longitudinal center line of said spreader and the other end secured to the center of the respective connecting or end beam of said U shaped end portions,
- means for operating said cylinders remotely and selectively to permit selection of variable lengths of lifting spreaders from the operator's control position,
- twist locks for engaging cargo containers disposed at the corners of the U shaped end portions of the junctions of the legs with the end beams, and
- means mounted on the U shaped end portions for operating the twist locks, said operating means being remotely and selectively controllable to permit at will engagement and disengagement of cargo containers by the operator.

References Cited

UNITED STATES PATENTS

| | | | |
|---|---|---|---|
| 1,846,038 | 2/1932 | Owens | 294—67 |
| 2,842,391 | 7/1958 | Hermann | 294—81 |
| 3,119,499 | 1/1964 | Tallquist | 294—81 |
| 3,176,853 | 4/1965 | Baudhuin et al. | 212—14 |

FOREIGN PATENTS 1,024,222  2/1958  Germany.

ANDRES H. NIELSEN, Primary Examiner

U.S. Cl. X.R.

294—81

UNITED STATES PATENT OFFICE
CERTIFICATE OF CORRECTION

Patent No. 3,514,146  May 26, 1970

Charles H. Zweifel et al.

It is certified that error appears in the above identified patent and that said Letters Patent are hereby corrected as shown below:

Column 2, line 68, "hnadle" should read -- handle --. Column 3 line 6, "inveniton" should read -- invention --; line 15, "descripition" should read -- description --. Column 4, line 20, "24" should read -- 24, --; line 23, "cotnainers" should read -- containers --; line 56, "corner" should read -- corners --.

Signed and sealed this 2nd day of March 1971.

(SEAL)
Attest:

Edward M. Fletcher, Jr.
Attesting Officer

WILLIAM E. SCHUYLER, JR.
Commissioner of Patents